(12) United States Patent
Meggiolan (10) Patent No.: US 10,723,174 B2
(45) Date of Patent: Jul. 28, 2020

(54) BICYCLE FREE WHEEL AND WHEEL HUB COMPRISING SUCH A FREE WHEEL

(71) Applicant: CAMPAGNOLO S.r.l., Vicenza (IT)

(72) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 103 days.

(21) Appl. No.: 16/183,917

(22) Filed: Nov. 8, 2018

(65) Prior Publication Data
US 2019/0135036 A1    May 9, 2019

(30) Foreign Application Priority Data

Nov. 9, 2017    (IT) ........................ 102017000128092

(51) Int. Cl.
*B60B 27/04* (2006.01)
*B60B 27/02* (2006.01)
*F16D 41/36* (2006.01)
*F16D 27/01* (2006.01)

(52) U.S. Cl.
CPC .......... *B60B 27/047* (2013.01); *B60B 27/023* (2013.01); *F16D 27/01* (2013.01); *F16D 41/36* (2013.01)

(58) Field of Classification Search
None
See application file for complete search history.

(56) References Cited

U.S. PATENT DOCUMENTS

| 2014/0062164 A1 | 3/2014 | Spahr et al. |
| 2017/0015137 A1 | 1/2017 | Braedt et al. |
| 2017/0267024 A1 | 9/2017 | Peng |

FOREIGN PATENT DOCUMENTS

| EP | 2 599 643 A1 | 6/2013 |
| EP | 3 118 019 A1 | 1/2017 |

OTHER PUBLICATIONS

Italian Search Report and Written Opinion in Italian Application No. 102017000128092, dated Aug. 30, 2018, with English translation.

*Primary Examiner* — Timothy Hannon
(74) *Attorney, Agent, or Firm* — Volpe and Koenig, P.C.

(57) ABSTRACT

A bicycle free wheel has a first annular body, at least partially ferromagnetic, configured to be rotatable with sprockets of a bicycle and comprising a first crown gear. A second annular body configured to be rotatable with a rear wheel of a bicycle has a second crown gear matching with and facing towards the first crown gear. The first annular body is axially mobile with respect to the second annular body between an engagement condition in which the first crown gear is coupled with the second crown gear and a disengagement condition where they are decoupled. At least one magnetic body is arranged radially externally with respect to the first annular body, so that the first annular body in the disengagement condition is at least partially contained in the axial space occupied by the magnetic body.

20 Claims, 8 Drawing Sheets

BICYCLE FREE WHEEL AND WHEEL HUB COMPRISING SUCH A FREE WHEEL

CROSS REFERENCE TO RELATED APPLICATION

This application claims the benefit of Italian Patent Application No. 102017000128092, filed on Nov. 9, 2017, which is incorporated herein by reference as if fully set forth.

FIELD OF INVENTION

The present invention relates to a bicycle free wheel and a wheel hub that comprises such a free wheel.

BACKGROUND

The motion transmission system of a bicycle comprises a pair of pedal cranks, on which the cyclist exerts a propulsive thrust, one or more guiding toothed wheels, set in rotation by direct coupling with the pedal cranks, and a plurality of driven toothed wheels, also called sprockets, of different dimensions, set in rotation by the guiding toothed wheels through a transmission chain.

The sprockets are coupled with the rear wheel of the bicycle through a hub. The hub is rigidly connected to the rim of the bicycle through spokes, and is coupled with the sprockets through a mechanism in the jargon called "free wheel".

The free wheel makes it possible to transmit the rotation of the sprockets to the rear wheel when the rotation speed of the sprockets is equal to the rotation speed of the rear wheel and makes it possible to decouple the movement between the sprockets and the rear wheel when the rotation speed of the sprockets is different from that of the wheel.

The free wheel thus allows the integral movement between sprockets and rear wheel only when the sprockets are set in rotation in the direction of rotation of the rear wheel and at the same speed as the wheel, whereas in the opposite direction or for rotation speeds lower than those of the wheel it does not produce any effect on the rear wheel that continues in its rotation by inertia and does not force the cyclist to keep the legs moving to follow the rotation of the rear wheel.

One type of free wheel provides for an annular body rotatably integral with the sprockets and an annular body rotatably integral with the rear wheel. The two annular bodies rotate around the same rotation axis substantially coinciding with the rotation axis of the hub of the rear wheel.

The two annular bodies have respective mutually facing axial toothings. Such toothings are shaped so that, when in mutual axial engagement, transmit a drive torque from the annular body connected to the sprockets to the annular body connected to the rear wheel when the sprockets rotate in a first angular direction, thus transmitting the rotation of the sprockets to the rear wheel when the cyclist exerts a propulsive action on the pedals. The axial toothings are unable to transmit any drive torque between the two annular bodies when the rotation speed of the sprockets in the first angular direction is less than the angular speed of the rear wheel or when the sprockets rotate in a second angular direction, thus allowing the free rotation of the rear wheel when the cyclist stops the propulsive action on the pedals or when actuates the pedals in the opposite direction to the propulsion direction.

Usually, the aforementioned axial toothings are configured according to a circumferential track comprising a sequence of inclined planes separated by substantially axial planes, to form a substantially a "sawtooth wave" geometry. During rotations in the first angular direction, the axial planes of the annular body integral with the sprockets are in abutment against the axial planes of the annular body integral with the rear wheel, transmitting the motion of the sprockets to the rear wheel. During rotations in the second angular direction of the sprockets or when the rotation speed in the first angular direction of the sprockets is less than the angular speed of the rear wheel, the inclined planes of the annular body integral with the sprockets slide on the inclined planes of the annular body integral with to the rear wheel, interrupting the transmission of motion between sprockets and rear wheel.

Following the sliding between the inclined planes, the two annular bodies axially move apart and the axial toothings loss mutual contact.

In order to recouple the axial toothings with one another (condition necessary to transmit the motion from the sprockets to the rear wheel), the free wheel comprises return members usually made from elastic or magnetic elements arranged in the radial space occupied by one of the annular bodies and that exert a constant or intermittent axial thrust action on one of the annular bodies towards the other annular body.

Such an axial thrusting action recouples the annular bodies when the cyclist restarts the propulsive action.

Examples of magnetic return members are described in documents US 2014/0062164 and US 2017/0015137.

SUMMARY

The Applicant has noted that the use of the free wheels described above results in a dissipation of kinetic energy of the rear wheel that can even be of the order of about 2 Watt at a speed of about 50 Km/h when the cyclist stops applying a propulsive action.

Such dissipation of kinetic energy has a negative impact on the performance of the cyclist, forcing the cyclist to exert greater force to compensate for the kinetic energy dissipated.

The Applicant has verified that such dissipation of kinetic energy can be ascribed to the substantially continuous and constant sliding of the inclined planes of the axial toothings of an annular body on the inclined planes of the axial toothings of the other annular body when the cyclist has stopped exerting propulsive action.

The Applicant deems that such sliding between the axial toothings can be ascribed to the return members that exert the aforementioned axial thrusting action of one annular body towards the other annular body.

The Applicant has indeed verified that such an axial thrusting action triggers a repetitive process (which stops only when the cyclist exerts propulsive action again) during which every axial separation of the two annular bodies is followed by an immediate movement together thereof (caused by the return members) during which the inclined planes of the two annular bodies slide on one another, dissipating energy.

The Applicant has also noted that the continuous sliding of the inclined planes of the axial toothings of the annular bodies causes an intermittent noise that, as well as being an indication of energy dissipation, could distract the cyclist from the maximum concentration.

The proposed solution is a bicycle free wheel that has a first annular body that is at least partially ferromagnetic and includes a first crown gear. A second annular body that rotates with the first annual body and a rear wheel of a bicycle has and comprising a second crown gear that faces the first crown gear. The wheel hub includes a magnet that is positioned to act on the first annual body when it is disengaged from the second annular body and draw the first annual body into an axial space associated with the magnet.

BRIEF DESCRIPTION OF THE DRAWINGS

The features and advantages of the invention will become clearer from the following description of preferred embodiments thereof, made with reference to the attached drawings. In such drawings.

DETAILED DESCRIPTION OF THE PREFERRED EMBODIMENTS

The present invention therefore relates, in a first aspect, to a bicycle free wheel comprising:

a first annular body, at least partially ferromagnetic, rotatable about a rotation axis, configured to be rotatably integral with sprockets of a bicycle and comprising a first crown gear;

a second annular body rotatable around said rotation axis, configured to be rotatably integral with a rear wheel of a bicycle and comprising a second crown gear matching with and facing towards said first crown gear;

said first annular body being axially mobile with respect to the second annular body between an engagement condition in which the first crown gear is coupled with the second crown gear and a disengagement condition in which the first crown gear is decoupled from the second crown gear;

at least one magnetic body, having an axial extension, arranged radially externally with respect to said first annular body;

said first annular body in the disengagement condition being at least partially contained in the axial extension of the magnetic body.

The present invention relates, in a second aspect thereof, to a wheel hub comprising a free wheel in accordance with the first aspect of the invention, a hub axis coaxial to said rotation axis, a hub body rotatable around said hub axis, a spoke-holding flange integral with said hub body, wherein said second annular body and said magnetic body are integral with said spoke-holding flange.

The Applicant has perceived that by arranging a magnetic body radially outside of the first annular body, the force lines of the magnetic field generated by the magnetic body enter the first annular body, when in the disengagement condition, along directions having a radial component.

The Applicant has verified that such a radial component of the force lines of the magnetic field generates an attractive force directed radially on the first annular body, so holding the first annular body in substantially stable position and preventing the latter from moving accidentally towards the second annular body when in disengagement condition.

This prevents the crown gears of the first and second annular body from sliding or in any case being in contact when the first annular body is in the disengagement condition, preventing dissipations of kinetic energy of the rear wheel and avoiding noisiness of the free wheel when the rear wheel of the bicycle rotates independently from the sprockets.

The Applicant has also verified that the first annular body moves between the engagement condition and the disengagement condition and vice-versa along an axial direction that does not coincide with the direction of the magnetic flux where the magnetic flux is more intense (namely in the region immediately adjacent to the magnetic poles), also allowing forces of small magnitude (like for example those generated inside the free wheel through the effect of the different rotation speeds between rear wheel and sprockets) to move the first annular body towards the engagement condition.

In the present description and in the subsequent claims, the term "magnetic pole" is meant to indicate a region characterized by a magnetic flux exiting or entering a magnetic field generated by a magnetic dipole.

The components of the free wheel are configured to rotate around a rotation axis coinciding with the rotation axis of the rear wheel of the bicycle. Such a rotation axis is the main reference axis for the elements that form part of the present invention; all of the indications of direction and similar, such as "axial", "radial", "circumferential" and "diametral" will refer to it. The indications "outwards", "externally" and "inwards", "internally" referring to radial directions should be interpreted, respectively, as away from the rotation axis or towards the rotation axis. The indications "outwards", "externally" and "inwards", "internally" referring to axial directions must be interpreted, respectively, as away from a radial mid-plane of the wheel of the bicycle or towards such a radial plane (when the free wheel is in use).

The present invention can comprise one or more of the following preferred features, individually or in combination, referring to the first and/or to the second aspect of the present invention.

Preferably, said magnetic body has a first magnetic pole radially aligned with a second magnetic pole of the magnetic body.

In this way, the flux exiting (or entering) the magnetic body is directed radially towards the first annular body, increasing the radial component of the attraction force of the magnetic body on the first annular body.

The Applicant deems that this makes it possible to increase the stability of the first annular body when in the disengagement condition without however requiring a greater force in the axial direction to move the first annular body towards the second annular body since the attraction force is directed substantially perpendicular to the direction of movement of the first annular body.

Preferably, said first annular body in the disengagement condition axially overlaps the magnetic body for an amount equal to at least 10%, preferably at least 30%, even more preferably at least 50% of the axial extent of the first annular body or the first annular body axially overlaps for at least 10%, preferably for at least 30%, even more preferably for at least 50% of the axial extent of the magnetic body.

In this way, the effect of the magnetic body on the first annular body when in the disengagement condition allows the first magnetic body to be held in the axial position reached. The exact degree of overlap is a function of the attraction force of the magnetic body. The higher such an attraction force, the lower the degree of overlap can be.

Preferably, said magnetic body is configured to be rotatably integral with the rear wheel.

Preferably, a support body is provided, configured to support said sprockets, guide members being active between said support body and said first annular body to guide said first annular body between the engagement condition and the disengagement condition and vice-versa.

Preferably, said guide members guide said first annular body with respect to said support body along a direction having a component in the axial direction and a component in the circumferential direction.

In this way, the guide members translate the first annular body axially towards the magnetic body and, simultaneously rotate the first annular body by a few degrees with respect to the sprockets.

The guide members further allow to trigger the movement of the first annular body towards the second annular body when the cyclist exerts propulsion action again, since when the cyclist exerts propulsion action again, setting the sprockets in rotation at the same angular speed as the rear wheel, the support body is subjected to an angular acceleration.

The angular acceleration of the support body transfers a force directed in the circumferential direction to the first annular body, through the guide members.

Such a force determines a roto-translation of the first annular body with respect to the support body that takes the first annular body axially towards the second annular body.

The movement in the axial direction of the first annular body allows it to come out from the radial force lines of the magnetic field of the magnetic body and thus to abandon the axial position taken up in the disengagement condition.

Preferably, said guide members comprise a radially outer surface of the support body having a first plurality of recesses alternating with a first plurality of projections and a radially inner surface of the first annular body having a second plurality of projections alternating with a second plurality of recesses respectively matching with the first plurality of recesses and with the first plurality of projections.

Preferably, said first and second plurality of recesses and of projections have a spiral-shaped extension.

Preferably, said first annular body is at least partially housed in an annular groove of the second annular body when in the engagement condition.

In this way, the first annular body and the second annular body cannot move radially with respect to one another.

Preferably, said first annular body comprises a radially outer surface counter-shaped to the annular groove of the second annular body.

In this way, the first annular body is guided in a self-centering manner on the second annular body.

Preferably, said first annular body comprises a third crown gear radially external with respect to said first crown gear and said second annular body comprises a fourth crown gear radially external with respect to said second crown gear, said third crown gear being coupled with said fourth crown gear in the engagement condition and being decoupled from said fourth crown gear in said disengagement condition.

In this way, the mechanical coupling between the first annular body and the second annular body (when in engagement condition) is distributed over a larger surface and therefore is more stable and reliable.

Preferably, a plurality of equally circumferentially spaced magnetic bodies is provided, wherein the first magnetic pole of each magnetic body is radially aligned with the respective second magnetic pole.

Preferably, it is provided a hub axis coaxial to said rotation axis, a hub body rotatable about said hub axis, a spoke-holding flange integral with said hub body, wherein said second annular body and said magnetic body are fixedly connected to said spoke-holding flange.

Preferably, said second annular body comprises a toothed radially outer surface and said spoke-holding flange comprises a toothed radially inner surface matching with the toothed radially outer surface of the second annular body.

Preferably, a plurality of magnetic bodies are inserted in housing seats formed on a radially outer surface of the spoke-holding flange.

Figure 1:
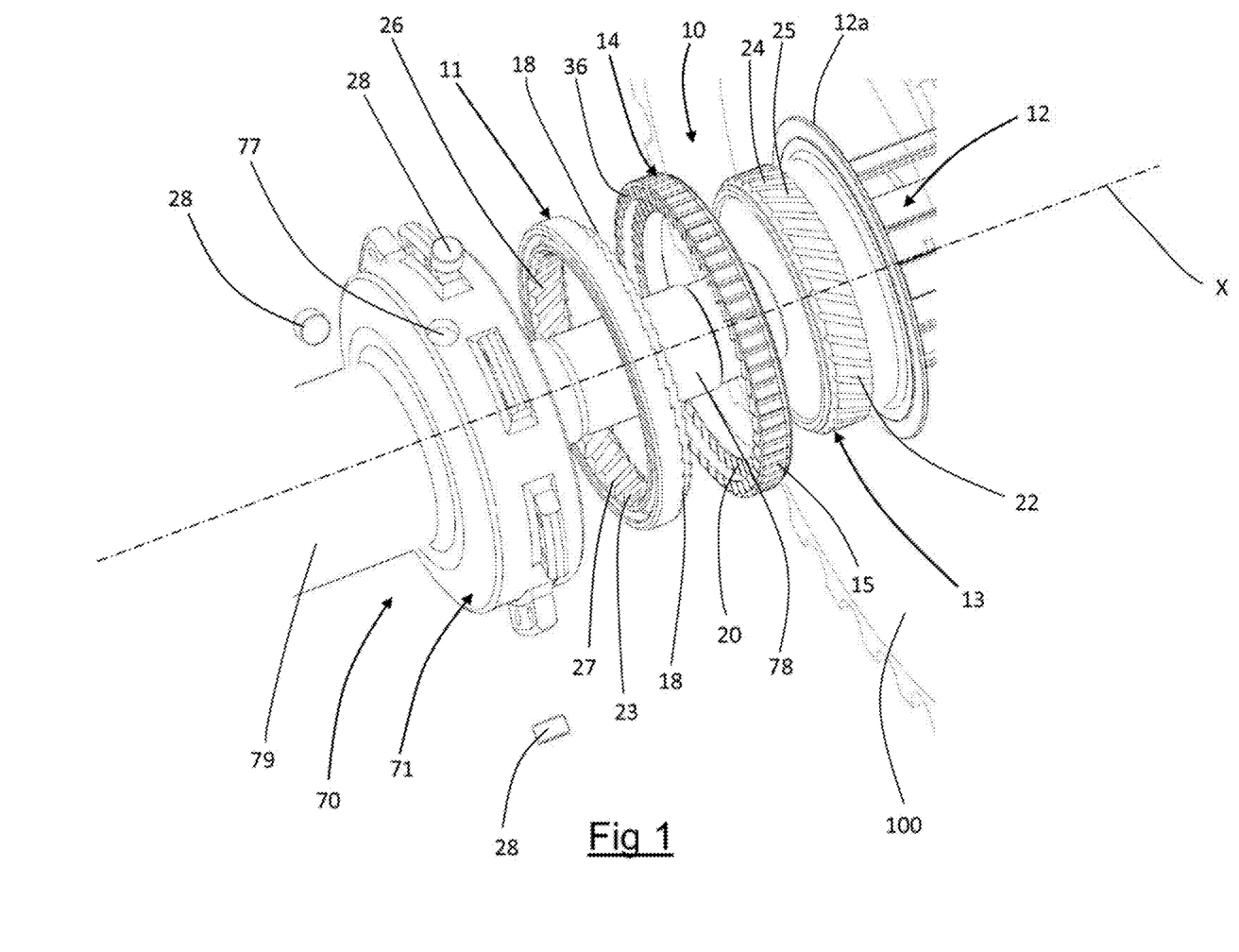
FIG. 1 is an exploded view of a bicycle free wheel in accordance with the present invention.

Turning to drawings figures, FIG. 1 illustrates a free wheel 10 in accordance with the present invention.

The free wheel 10 comprises a first annular body 11 arranged around a rotation axis X of a rear wheel of a bicycle.

The first annular body 11 is at least partially made of ferromagnetic material, like for example ferromagnetic steel.

The first annular body 11 is configured to be set in rotation by a cassette 100 and to be rotatably integral with it. In particular, the first annular body 11 is configured to rotate in a first angular direction A (FIG. 8) in accordance with the cassette 100 when the cyclist exerts a propulsion action on the pedals and to rotate in a second angular direction B, opposite to the first direction A, in accordance with the cassette 100 when the cyclist sets the pedals of the bicycle in rotation in the opposite direction with respect to the propulsion direction.

The free wheel 10 comprises a support body 12 for the cassette 100 which is configured to support the sprockets and to be set in rotation by them.

Figure 8:
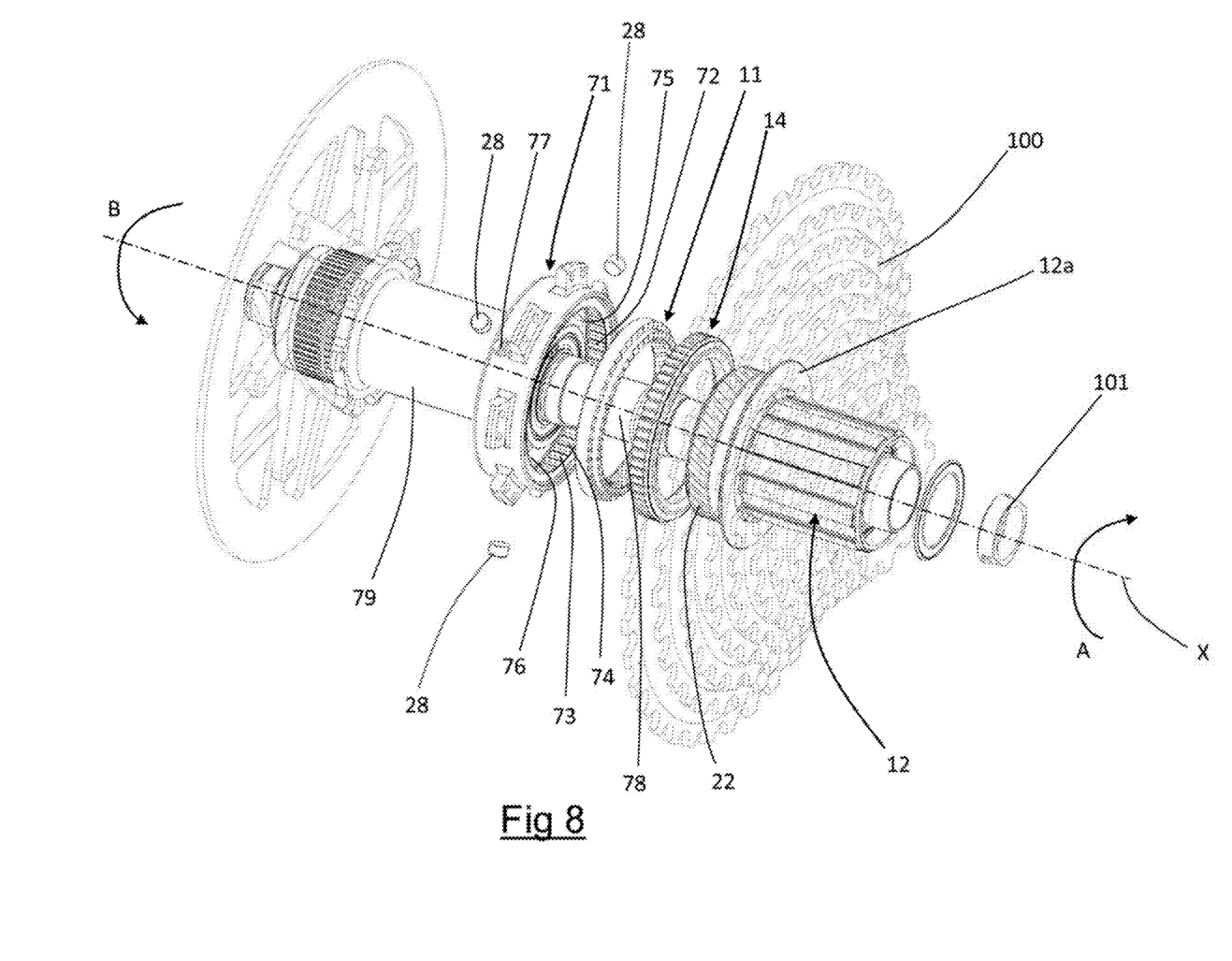
FIG. 8 is an exploded perspective view of a wheel hub comprising the free wheel of FIG. 1.
Figure 9:
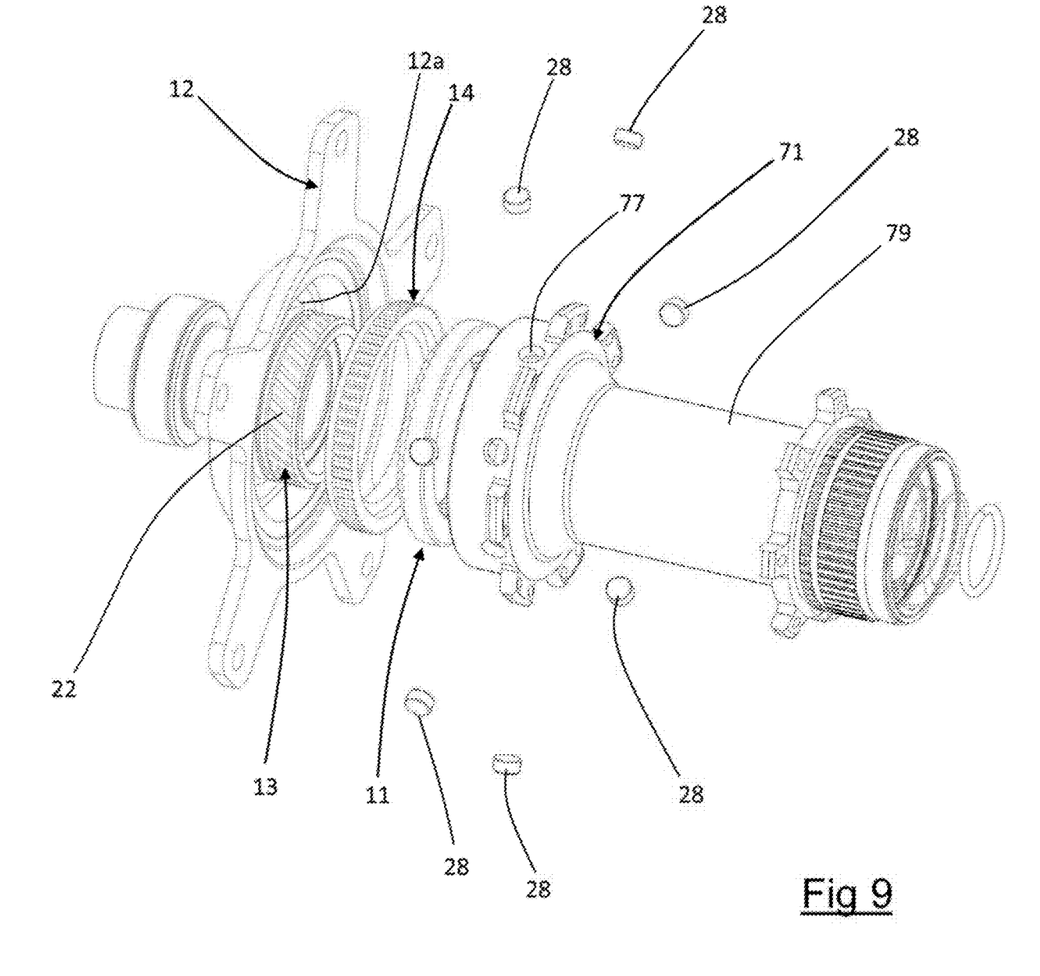
FIG. 9 is an exploded perspective view of a further wheel hub comprising the free wheel of FIG. 1.

The support body 12 can be a substantially cylindrical body, equipped with a plurality of axially directed grooves on which the cassette 100 is fitted and axially held by a ring nut 101 (as illustrated in the example of FIG. 8), or it can be a body to which a monolithic cassette 100 is rigidly connected (like in the example illustrated in FIG. 9).

In other embodiments that are not illustrated, the support body 12 can be integrated in the cassette 100, in other words it can be in one piece with the cassette 100.

In any case, the support body 12 comprises an annular shoulder 12a.

Between the support body 12 and the first annular body 11 there are guide members 13 which allow the support body 12 to transmit the rotation imparted to the cassette 100 to the first annular body 11.

The guide members 13 are arranged axially more internally with respect to the annular shoulder 12a, as represented in FIG. 1.

The free wheel 10 further comprises a second annular body 14 which is configured to be rotatably integral with the rear wheel of the bicycle.

The second annular body 14 is rotatably coupled with a spoke-holding flange 71 of a wheel hub 70 better illustrated in FIGS. 8 and 9.

As illustrated in FIG. 8, the spoke-holding flange 71 comprises a radially inner surface 72 having a plurality of projections 73 extending axially spaced by recesses 74 extending axially.

The second annular body 14 comprises a toothed radially outer surface 15 having a plurality of projections 16 extending axially spaced by recesses 17 extending axially counter-shaped to the projections 73 and recesses 74 of the spoke-holding flange 71.

The second annular body 14 is inserted inside a substantially cylindrical cavity 75 of the spoke-holding flange 71 radially delimited by the toothed radially inner surface 72, so as to rotatably couple the second annular body 14 with the spoke-holding flange 71.

The cavity 75 of the spoke-holding flange 71 is delimited, in axially inner direction, by a bottom wall 76.

It should be noted that the external diameter of the second annular body 14 is substantially equal to the internal diameter of the cavity 75 of the spoke-holding flange 71.

In an engagement condition (illustrated in FIG. 2), the first annular body 11 makes it possible to transfer the rotary motion of the cassette 100 to the second annular body 14 when the angular speed of the cassette 100 in the first angular direction A is equal to the angular speed of the rear wheel in the first angular direction A.

Figure 2:
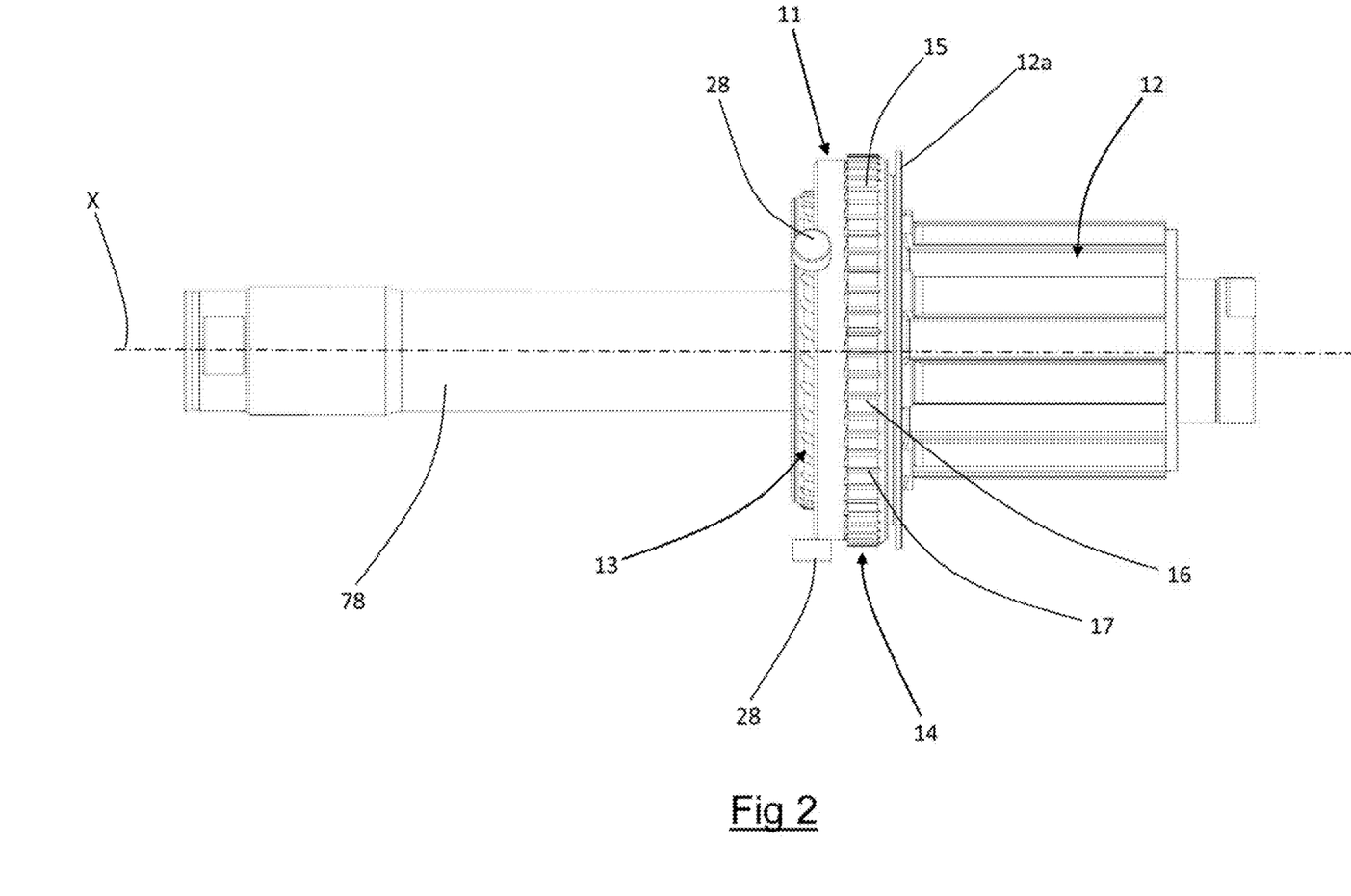
FIG. 2 is a side view of the free wheel of FIG. 1 in a first operative condition.

In other words, in the engagement condition, the angular speed of the first annular body 11 in the first angular direction A is equal to the angular speed of the second annular body 14 in the first angular direction A.

In the engagement condition, therefore, the rotation of the cassette 100 is transferred to the rear wheel, in other words the first annular body 11 integrally rotates with the second annular body 14.

In order to rotatably couple the first annular body 11 and the second annular body 14, the first annular body 11 comprises a first crown gear 18 having teeth 19 directed axially towards the second annular body 14.

The second annular body 14 comprises a second crown gear 20 having teeth 21 directed axially towards the first annular body 11 and matching with the teeth 19 of the first crown gear 18.

Figure 4:
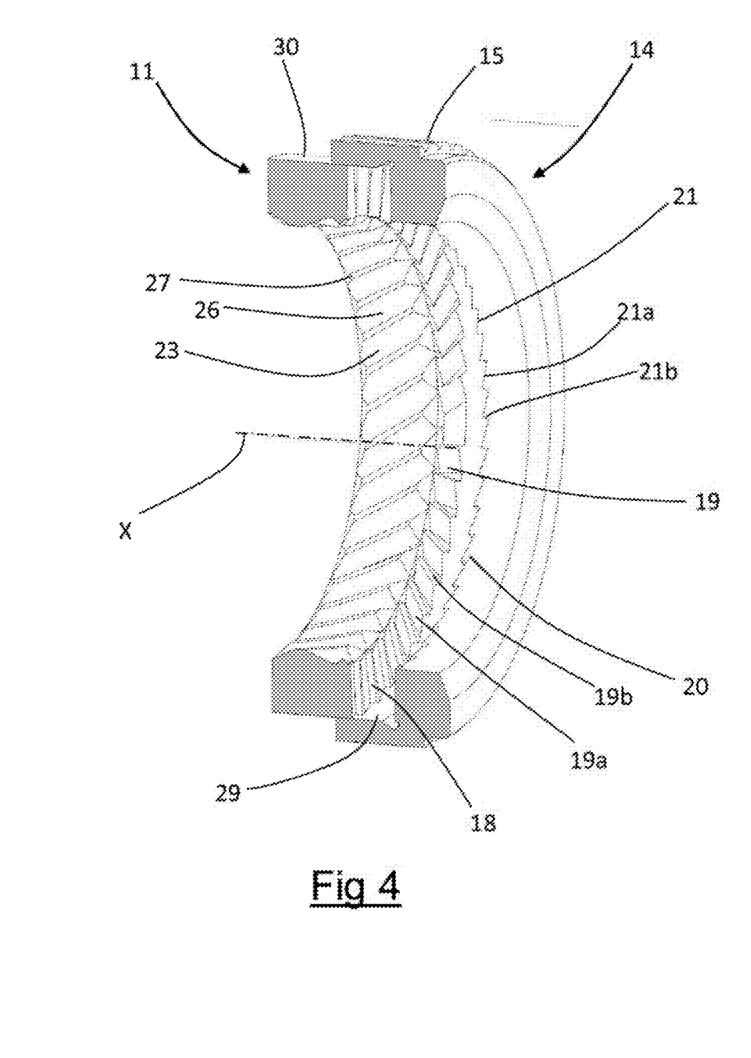
FIGS. 4 to 7 are perspective cross-sectional views of possible embodiments of some details of the free wheel of FIG. 1.

As better illustrated in FIG. 4, the teeth 19, 21 of the first 18 and of the second crown gear 19 have a "sawtooth wave" shaped profile, in other words they comprise a succession of first substantially flat portions 19a, 21a inclined with respect to the axial direction spaced with second substantially flat portions 19b, 21b lying in planes parallel to the rotation axis X, or in planes inclined with respect to the rotation axis X so that the second portions 19b, 21b are undercut with the first portions 19a, 21a.

In the engagement condition, the first annular body 11 is in contact with the second annular body 14 and the first crown gear 18 is in engagement with the second crown gear 20.

Concerning this, the first 18 and the second crown gear 20 are configured so that the second flat portions 19b of the first crown gear 18 are in abutment on the second flat portions 21b of the second crown gear 19, preventing rotations of the first annular body 11 with respect to the second annular body 14 in the first angular direction A and transferring the motion of the first annular body 11 to the second annular body 14.

When the first 11 and the second annular body 14 are in the engagement condition, the first annular body 11 is in a first axial position internal with respect to the second annular body 14, as represented in FIG. 2.

In a disengagement condition (illustrated in FIG. 3), the first annular body 11 is unable to transmit motion to the second annular body 14.

Figure 3:
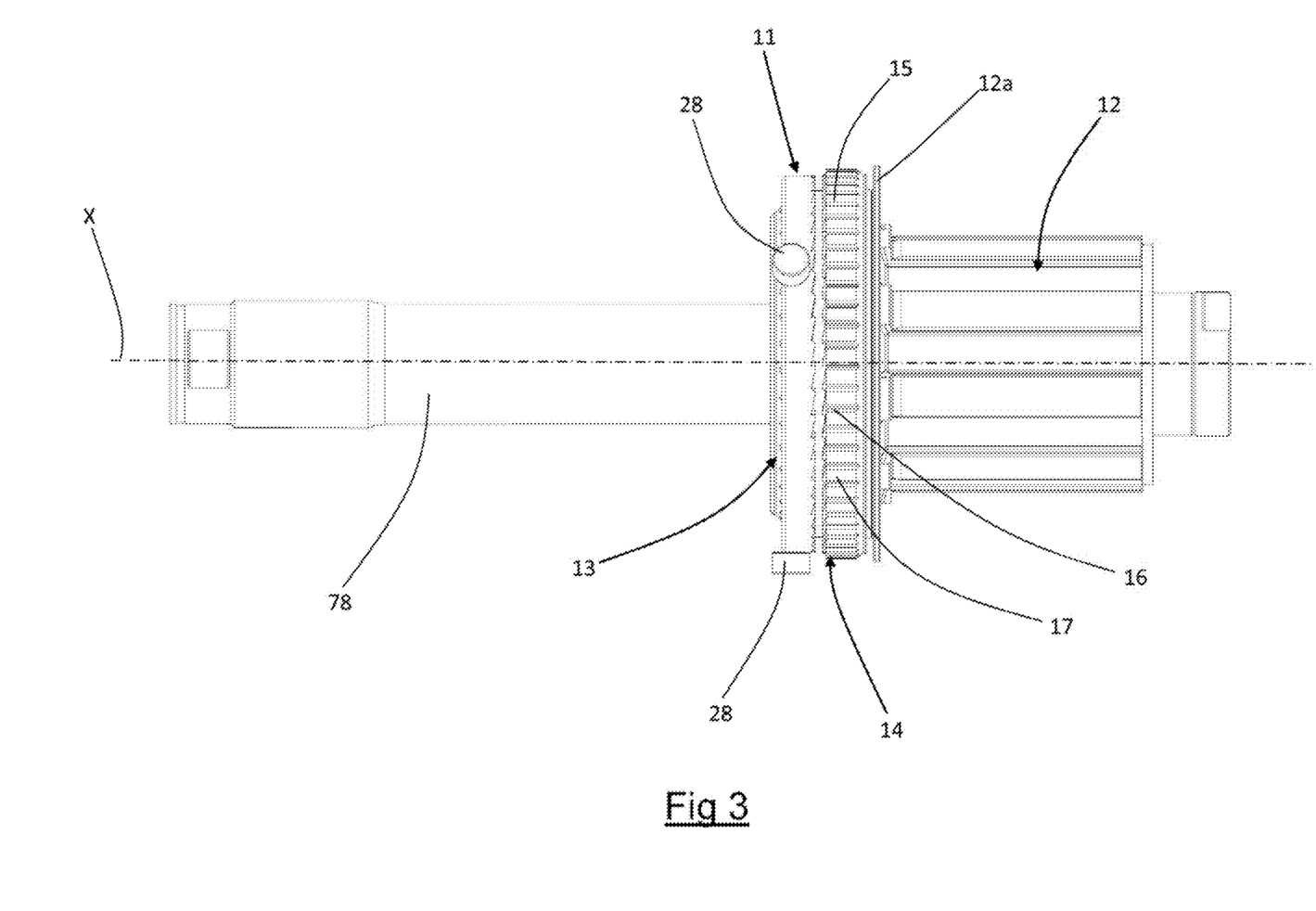
FIG. 3 is a side view of the free wheel of FIG. 1 in a second operative condition.

The disengagement condition occurs when the angular speed of the cassette 100 in the first angular direction A is less than the angular speed of the rear wheel in the first angular direction A, when the angular speed of the cassette 100 is zero and the angular speed in the first angular direction A of the rear wheel is greater than zero or when the angular speed of the cassette 100 is directed in the second angular direction B.

In other words, in the disengagement condition the second annular body 14 rotates with respect to the first annular body 11 in the first angular direction A.

The first 18 and the second crown gear 20 are configured so that, for relative rotations of the second annular body 14 with respect to the first annular body 11 in the first angular direction A, the respective first portions 19a, 21a can slide over one another without the respective second portions 19b, 21b being able to abut on one another, thus allowing a free rotation of the second annular body 14 with respect to the first annular body 11.

In the disengagement condition, the axial position of the second annular body is identical to the axial position that the second annular body 14 takes up in the engagement condition.

In the disengagement condition the first annular body 11 reaches a second axial position more internal with respect to the first axial position taken up by the first annular body 11 when in the engagement condition.

For this purpose, the guide members 13 guide the first annular body 11 in the second axial position, axially spacing the first crown gear 18 of the first annular body 11 from the second crown gear 20 of the second annular body 14.

The guide members 13 comprise a radially outer surface 22 of the support body 12 and a radially inner surface 23 of the first annular body 11.

The radially outer surface 22 of the support body 12 is substantially cylindrical and comprises a first plurality of recesses 24 alternating with a first plurality of projections 25, as indicated in FIG. 1.

The radially inner surface 23 of the first annular body 11 is annular and comprises a second plurality of projections 26 alternating with a second plurality of recesses 27 respectively matching with the first plurality of recesses 24 and with the first plurality of projections 25 of the radially outer surface 22 of the support body 12.

The first plurality of projections 25 is inserted in the second plurality of recesses 27 and the second plurality of projections 26 is inserted in the first plurality of recesses 24 in both the fastened and disengaged conditions.

The radially outer surface 22 of the support body 12 has an axial extension greater than the axial extension of the first annular body 11.

The first 24 and the second plurality of recesses 27 and the first 25 and the second plurality of projections 26 have a substantially helical extension, as represented in FIG. 1.

In this way, the first annular body 11 is guided by the guide members 13 along a direction that has an axial component and a circumferential component.

The free wheel 10 further comprises at least one magnetic body 28. In the preferred embodiment of the invention, a plurality of magnetic bodies 28 are provided.

Each magnetic body 28 is arranged radially externally with respect to the first annular body 11.

The magnetic bodies 28 rotate as a unit with the rear wheel of the bicycle.

In the preferred embodiment of the invention, the magnetic bodies 28 are housed in housing seats 77 formed on a radially outer surface of the spoke-holding flange 71.

The housing seats 77 are equally circumferentially spaced from one another.

The magnetic bodies 28 are positioned in an axial position such that when the first annular body 11 is in the disengagement condition, the first annular body 11 is arranged for at least 10% of its axial extent in the axial extent of the magnetic bodies 28 or the first annular body 11 is in at least 10% of the axial extent of the magnetic bodies 28.

In other words, in the disengagement position the projection in the radial direction of the axial extent of the magnetic bodies 28 intercepts at least 10%, preferably at least 30% and even more preferably at least 50%, of the thickness in the axial direction of the first annular body 11 or the first annular body 11 intercepts at least 10%, preferably at least 30% and even more preferably at least 50%, of the projection in the radial direction of the axial extent of the magnetic bodies 28.

When the first annular body 11 is in the engagement condition, the first annular body 11 is axially more external with respect to the position occupied when in the disengagement condition and it is placed for less than 50% of the axial extent of the magnetic bodies 28 or it is in less than 50% of the axial extent of the magnetic bodies 28.

In the embodiment illustrated in FIGS. 1, 2, 3, 8 and 9, the magnetic body 28 has a first magnetic pole radially aligned with the second magnetic pole and radially inside it. In this embodiment, the magnetic body is oriented radially.

Figure 10:
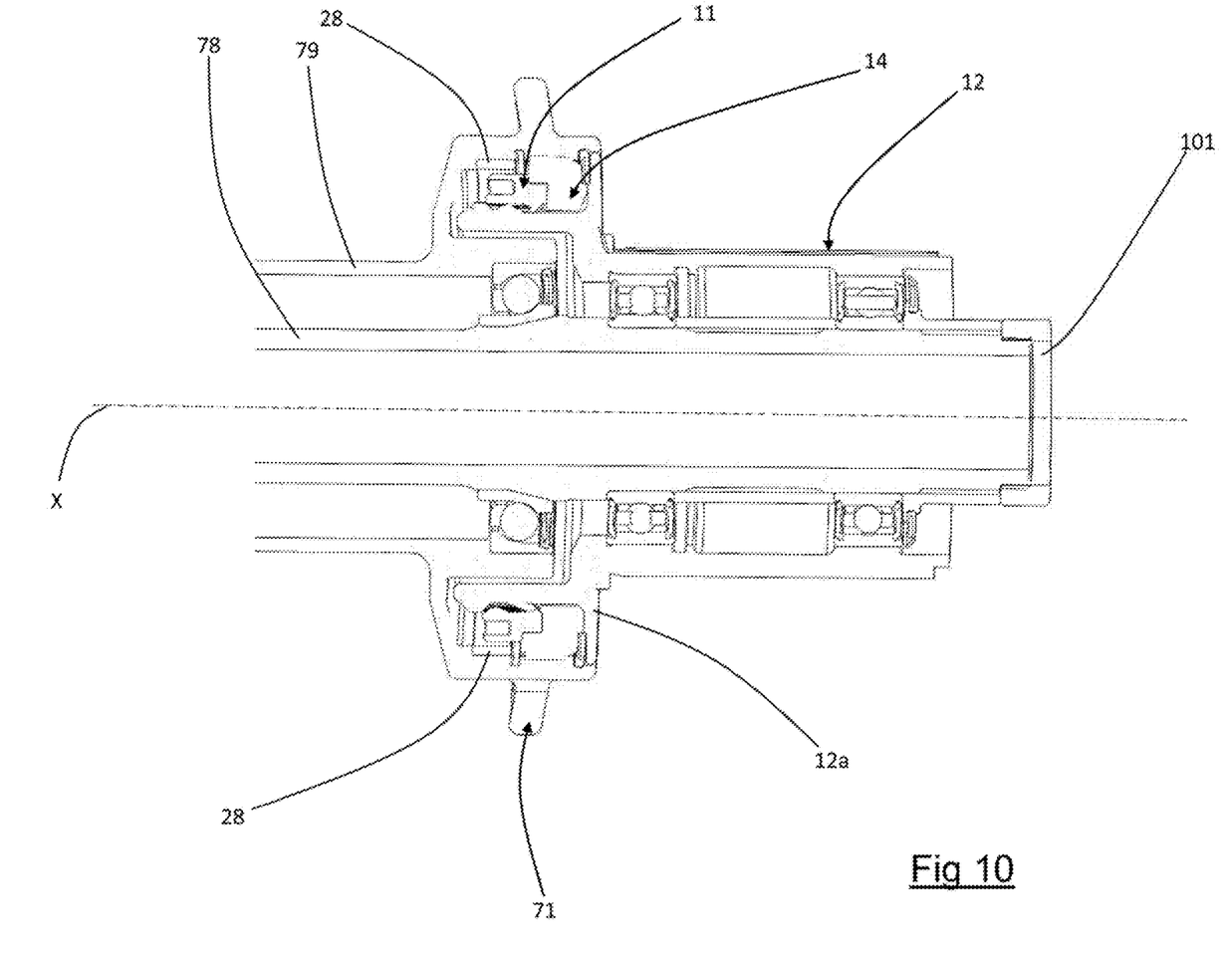
FIG. 10 is a longitudinal cross-sectional view of a further wheel hub comprising the free wheel of FIG. 1.

In the embodiment illustrated in FIG. 10, the magnetic body 28 has a first magnetic pole axially aligned with the second magnetic pole and axially inside it. In this embodiment, the magnetic body is oriented axially. The magnetic body 28 is preferably inserted in radially inner housings with respect to the spoke-holding flange 71, as represented in FIG. 10.

In both cases, as stated, the magnetic bodies 28 lie in radially outer positions with respect to the first annular body 11.

In use, the free wheel 10 operates as described hereinafter.

During propulsion pedaling of the cyclist, the first annular body 11 is in the engagement condition and is rotatably coupled with the second annular body 14, as illustrated in FIG. 2.

In this condition, the first crown gear 18 of the first annular body 11 is in engagement with the second crown gear 20 of the second annular body 14.

The second portions 19b of the teeth 19 of the first crown gear 18 are in abutment on the second portions 21b of the teeth 21 of the second crown gear 20 and the rotation of the first annular body 11 is transmitted to the second annular body 14.

When the cyclist stops or slows down his/her propulsion action, the second annular body 14 (integral with the rear wheel) has an angular speed in the first angular direction A greater than the angular speed in the same angular direction as the first annular body 11 (integral with the sprockets 100).

In this situation, the second portions 19b of the teeth 19 of the first crown gear 18 lose contact with the second portions 21b of the teeth 21 of the second crown gear 20 and the first portions 19a of the teeth 19 of the first crown gear 18 slide over the first portions 21a of the teeth 21 of the second crown gear 20.

Such sliding tends to move the first annular body 11 axially away from the second annular body 14 and to take the first annular body 11 into a more inner axial position.

The movement of the first annular body 11 is accompanied (and permitted) by the guide members 13. The configuration of the latter imparts a movement on the first annular body 11 along a helical trajectory that translates the first annular body 11 axially inwards and rotates it by a few degrees around the rotation axis X.

The axial movement of the first annular body 11 is interrupted when the teeth 19, 21 of the first 11 and second annular body 14 no longer interfere with one another.

In this position, the first annular body 11 reaches the disengagement condition, as illustrated in FIG. 3.

In this condition, the second annular body 14 rotates independently from the first annular body 11.

The axial movement of the first annular body 11 takes the latter to interact with the magnetic body 28.

In particular, in the disengagement condition the first annular body 11 axially overlaps the magnetic body 28 for an amount equal to at least 50% of the axial extent of the first annular body or overlaps for at least 50% of the axial extent of the magnetic body 28.

In this axial position, the first annular body 11 is attracted in the radial direction by the magnetic body 28, since it is entered by the flux of the magnetic field oriented radially exiting from (or entering into) the first pole of the magnetic body 28.

The first annular body 11 remains in the axial position reached and, therefore, does not interfere with the second annular body 14.

When the cyclist starts the propulsion action again, setting the sprockets 100 in rotation in the first angular direction A at the same angular speed as the rear wheel, the support body 12 is subjected to an angular acceleration.

The angular acceleration of the support body 12 transfers a force directed in the circumferential direction to the first annular body 11.

Such a force determines, through the effect of the helical configuration of the guide members 13, a roto-translation of the first annular body 11 with respect to the support body 12 that brings the first annular body 11 axially towards the second annular body 14.

The movement in the axial direction of the first annular body 11 allows it to come out from the radial force lines of the magnetic field of the magnetic body 28 and therefore to leave the axial position taken up in the disengagement condition.

The teeth 19 of the first crown gear 18 of the first annular body 18 go back into engagement with the teeth 21 of the second crown gear 20 of the second annular body 14 rotatably re-coupling the first annular body 11 with the second annular body 14.

In order to ensure an optimal coupling between the teeth 18 of the first crown gear 18 and the teeth 21 of the second crown gear 20, the second annular body 14 comprises an annular groove 29 arranged radially externally with respect to the second crown gear 20 and axially directed towards the first annular body 11, as illustrated in FIGS. 4 to 7.

The first annular body 11, when in the engagement condition, is at least partially inserted in the annular groove 29 which acts as a centering guide during the axial movement of the first annular body 11.

In a first embodiment of the first annular body 11 and of the second annular body 14, illustrated in FIG. 4, the annular groove 29 has sections with constant diameter, in other words it has a substantially cylindrical shape.

The first annular body 11 has a radially outer surface 30 counter-shaped to the annular groove 29, so as to insert axially in the latter and prevent any radial movement between the first 11 and the second annular body 14.

Figure 5:
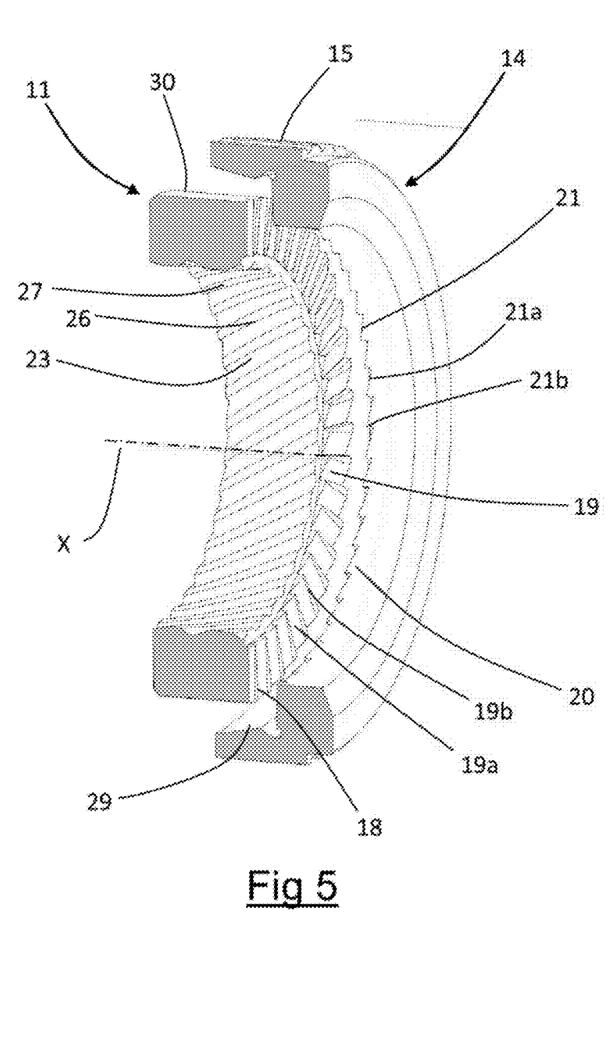

In a second embodiment of the first annular body 11 and of the second annular body 14, illustrated in FIG. 5, the annular groove 29 is flared and comprises an axially outer section of greater diameter with respect to an axially inner section, so as to define a frusto-conical facilitating surface for the first annular body 11.

The first annular body 11 comprises the radially outer surface 30 that is substantially cylindrical (as shown in FIG. 5) or frusto-conical and counter-shaped to the annular groove 29.

Figure 6:
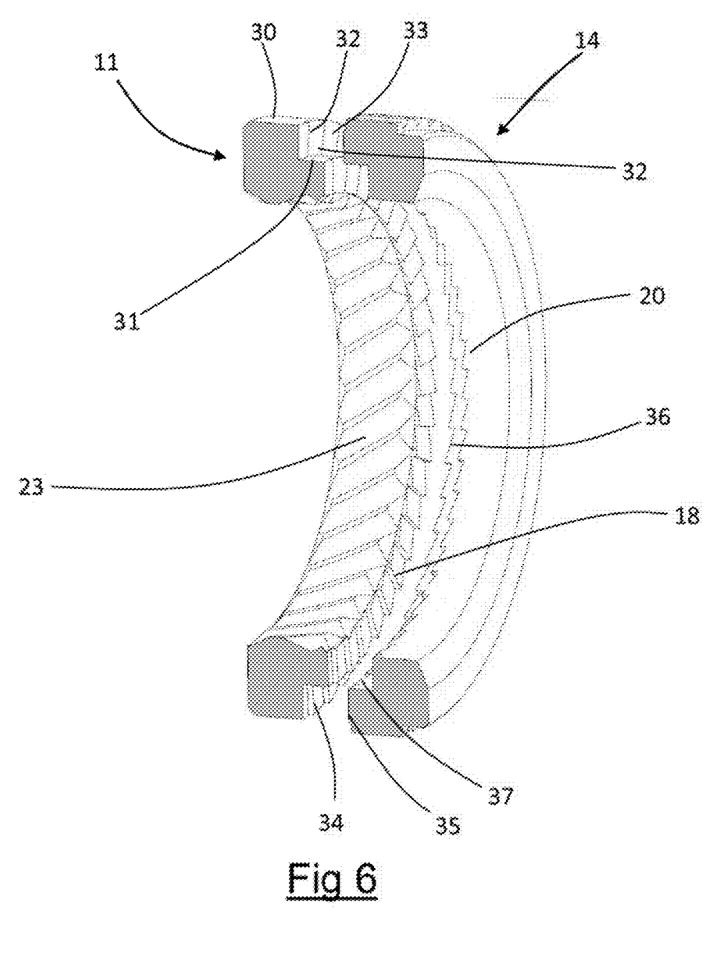

In a third embodiment of the first annular body 11 and of the second annular body 14, illustrated in FIG. 6, the annular groove 29 has sections of constant diameter, in other words it has a substantially cylindrical shape.

The first annular body 11 has a radial surface 31 outside of the first crown gear 18 counter-shaped to the annular groove 29. The first annular body 11 further comprises a radial shoulder 32 that extends between the radial surface 31 and the radially outer surface 30 of the annular body 11. On the radial shoulder 32 a third crown gear 33 is formed that is provided with teeth 34 identical to the teeth 19 of the first crown gear 18.

The second annular body 14 comprises an axially outer surface 35 having radial extension that extends from a free edge of the annular groove 29 and that abuts the radial shoulder 32 of the first annular body 11. On the axially outer surface 35 a fourth crown gear 36 is formed that is provided with teeth 37 identical to the teeth 21 of the second crown gear 20. The third crown gear 33 is in engagement on the fourth crown gear 36 when the first annular body 11 is in the engagement condition, making the rotational coupling between the first 11 and the second annular body 14 more effective.

Figure 7:
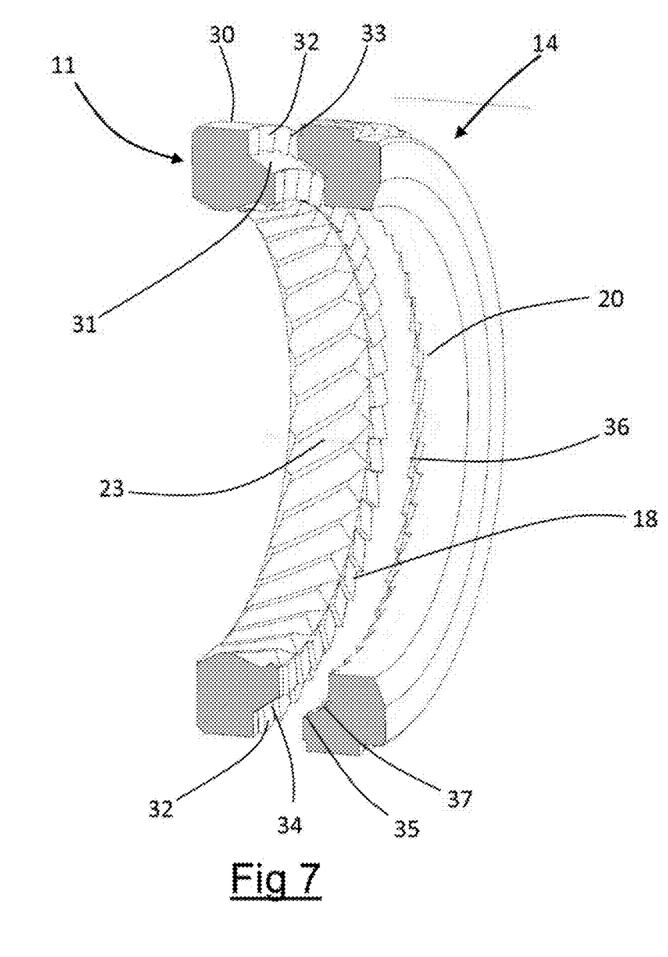

In a fourth embodiment of the first annular body 11 and of the second annular body 14, illustrated in FIG. 7, the annular groove 29 is flared and comprises an axially outer section of greater diameter with respect to an axially inner section, so as to define a frusto-conical facilitating surface for the first annular body 11.

The first annular body 11 has a radial surface 31 outside of the first crown gear 18 counter-shaped to the annular groove 29, in other words of substantially frusto-conical shape. The first annular body 11 further comprises a radial shoulder 32 that extends between the radial surface 31 and the radially outer surface 30 of the annular body 11. On the radial shoulder 32 a third crown gear 33 is formed that is provided with teeth 34 identical to the teeth 19 of the first crown gear 18.

The second annular body 14 comprises an axially outer surface 35 having radial extension that extends from a free edge of the annular groove 29 and that abuts the radial shoulder 32 of the first annular body 11. On the axially outer surface 35 a fourth crown gear 36 is formed that is provided with teeth 37 identical to the teeth 21 of the second crown gear 20. The third crown gear 33 is in engagement on the fourth crown gear 36 when the first annular body 11 is in the engagement condition, as already described in relation to the embodiment of FIG. 6.

FIGS. 8, 9 and 10 illustrate respective hubs 70 that comprise the free wheel 10.

Each hub 70 comprises the spoke-holding flange 71, a hub axis 78 concentric to the first 11 and second annular body 14 and a hub body 79 rotatably mounted on the hub axis 78.

The spoke-holding flange 71 is integral with the hub body 79 and is in an axially inner position with respect to the free wheel 10.

The support body 12 is rotatably mounted on the hub axis 78 (supported by rolling bearings that are not illustrated). The radially outer surface 22 of the support body 12, on which the guide members 13 are at least partially formed, is inserted in the cavity 75 of the spoke-holding flange 71 with the annular shoulder 12a of the support body 12 that closes the cavity 75 on the opposite side with respect to the bottom wall 76 of the spoke-holding body 71. A bush or gasket (not illustrated) can be provided between the annular shoulder 12a of the support body 12 and the cavity 75 of the spoke-holding flange 71 to prevent dirt or impurities from entering into the cavity 75.

In the cavity 75 the first 11 and the second annular body 14 are therefore housed, with the second annular body 14 arranged in axially outer position with respect to the first annular body 11.

The depth of the cavity 75 of the spoke-holding flange 71, in other words its axial extension, is at least equal to the axial extension of the radially outer surface 22 of the support body 12.

Of course, those skilled in the art can bring numerous modifications and variants to the invention described above, in order to satisfy specific and contingent requirements, all of which are in any case encompassed by the scope of protection of the present invention as defined by the following claims.

What is claimed is:

1. A bicycle free wheel comprising:
a first annular body, at least partially ferromagnetic, rotatable about a rotation axis (X), configured to be rotatably integral with sprockets of a bicycle and comprising a first crown gear;
a second annular body rotatable about said rotation axis (X), configured to be rotatably integral with a rear wheel of a bicycle and comprising a second crown gear matching with and facing towards said first crown gear;
said first annular body being axially mobile with respect to the second annular body between an engagement condition in which the first crown gear is coupled with the second crown gear and a disengagement condition in which the first crown gear is decoupled from the second crown gear;
at least one magnetic body, having an axial extension, arranged radially externally with respect to said first annular body;
said first annular body in the disengagement condition at least partially axially overlapping an axial extent of the magnetic body.

2. The bicycle free wheel according to claim 1, wherein said magnetic body has a first magnetic pole radially aligned with a second magnetic pole of the magnetic body.

3. The bicycle free wheel according to claim 2, further comprising a plurality of equally circumferentially spaced magnetic bodies, wherein the first magnetic pole of each magnetic body is radially aligned with the respective second magnetic pole.

4. The bicycle free wheel according to claim 2, wherein said first annular body in the disengagement condition axially overlaps the magnetic body for an amount equal to at least 10% of an axial extent of the first annular body or the first annular body axially overlaps for at least 10% of the axial extent of the magnetic body.

5. The bicycle free wheel according to claim 4, wherein said magnetic body is configured to be rotatably integral with the rear wheel.

6. The bicycle free wheel according to claim 4, comprising a support body configured to support said sprockets, guide members being active between said support body and said first annular body to guide said first annular body between the engagement condition and the disengagement condition and vice-versa.

7. The bicycle free wheel according to claim 6, wherein said guide members comprise a radially outer surface of the support body having a first plurality of recesses alternating with a first plurality of projections and a radially inner surface of the first annular body having a second plurality of projections alternating with a second plurality of recesses respectively matching with the first plurality of recesses and with the first plurality of projections.

8. The bicycle free wheel according to claim 4, wherein said first annular body comprises a third crown gear radially external with respect to said first crown gear and wherein said second annular body comprises a fourth crown gear radially external with respect to said second crown gear, said third crown gear being coupled with said fourth crown gear in the engagement condition and being decoupled from said fourth crown gear in said disengagement condition.

9. The bicycle free wheel according to claim 1, wherein said first annular body in the disengagement condition axially overlaps the magnetic body for an amount equal to at least 10% of an axial extent of the first annular body or the first annular body axially overlaps for at least 10% of the axial extent of the magnetic body.

10. The bicycle free wheel according to claim 1, wherein said magnetic body is configured to be rotatably integral with the rear wheel.

11. The bicycle free wheel according to claim 1, comprising a support body configured to support said sprockets, guide members being active between said support body and said first annular body to guide said first annular body between the engagement condition and the disengagement condition and vice-versa.

12. The bicycle free wheel according to claim 11, wherein said guide members guide said first annular body with respect to said support body along a direction having a component in an axial direction and a component in a circumferential direction.

13. The bicycle free wheel according to claim 11, wherein said guide members comprise a radially outer surface of the support body having a first plurality of recesses alternating with a first plurality of projections and a radially inner surface of the first annular body having a second plurality of projections alternating with a second plurality of recesses respectively matching with the first plurality of recesses and with the first plurality of projections.

14. The bicycle free wheel according to claim 13, wherein said first and second plurality of recesses and of projections have spiral-shaped extension.

15. The bicycle free wheel according to claim 1, wherein said first annular body is at least partially housed in an annular groove of the second annular body when in the engagement condition.

16. The bicycle free wheel according to claim 15, wherein said first annular body comprises a radially outer surface counter-shaped to the annular groove of the second annular body.

17. The bicycle free wheel according to claim 1, wherein said first annular body comprises a third crown gear radially external with respect to said first crown gear and wherein said second annular body comprises a fourth crown gear radially external with respect to said second crown gear, said third crown gear being coupled with said fourth crown gear in the engagement condition and being decoupled from said fourth crown gear in said disengagement condition.

18. A wheel hub comprising the bicycle free wheel according to claim 1, having a hub axis coaxial to said rotation axis (X), a hub body rotatable around said hub axis, a spoke-holding flange integral with said hub body, wherein said second annular body and said magnetic body are integral with said spoke-holding flange.

19. The wheel hub according to claim 18, wherein said second annular body comprises a toothed radially outer surface and wherein said spoke-holding flange comprises a toothed radially inner surface and matching with the toothed radially outer surface of the second annular body.

20. The wheel hub according to claim 18, wherein a plurality of magnetic bodies are in housing seats formed on a radially outer surface of the spoke-holding flange.

* * * * *